(No Model.)
J. W. REID.
BUNDLE CARRIER FOR HARVESTERS.
No. 271,119. Patented Jan. 23, 1883.
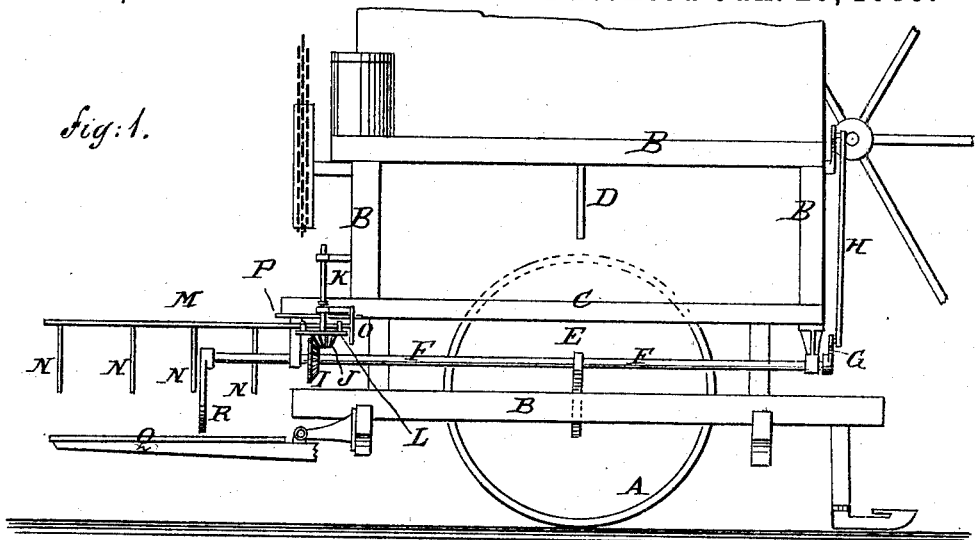
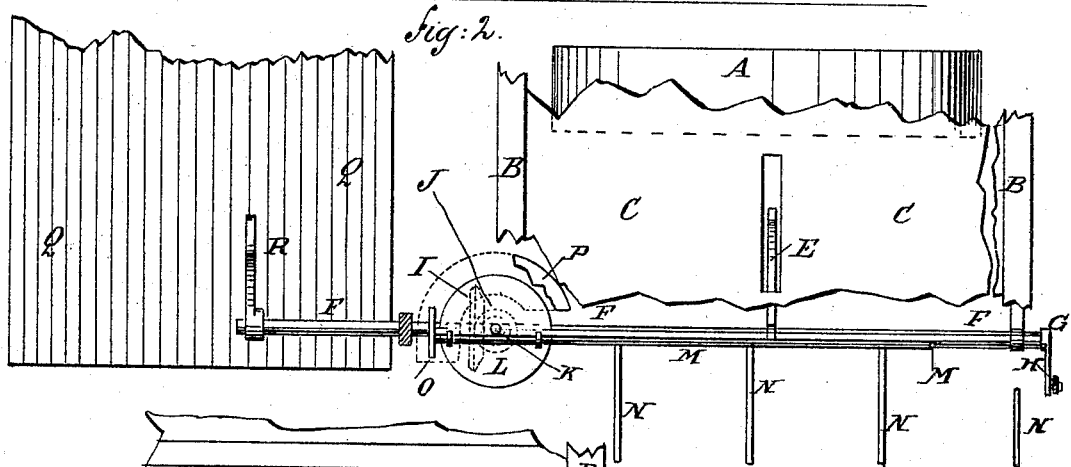
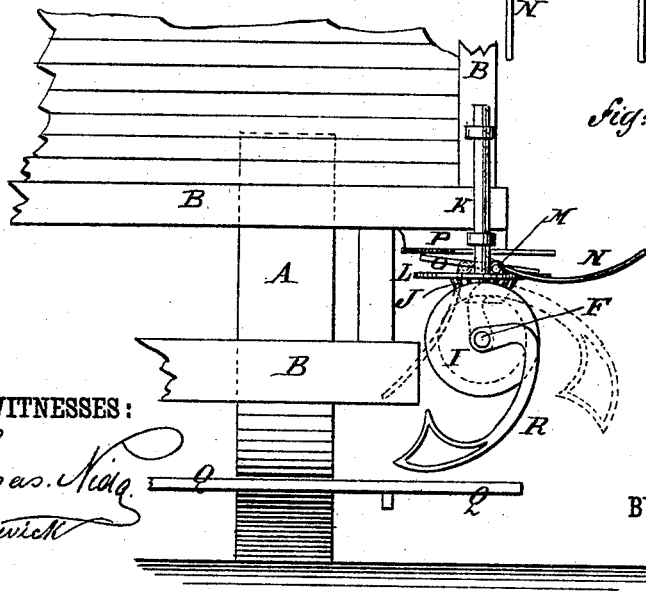
WITNESSES:
INVENTOR:
J. W. Reid
BY
ATTORNEYS.

UNITED STATES PATENT OFFICE.

JAMES W. REID, OF UNION CITY, MICHIGAN.

BUNDLE-CARRIER FOR HARVESTERS.

SPECIFICATION forming part of Letters Patent No. 271,119, dated January 23, 1883.

Application filed August 29, 1882. (No model.)

*To all whom it may concern:*

Be it known that I, JAMES W. REID, of Union City, Branch county, and State of Michigan, have invented a new and useful Improvement in Bundle-Carriers for Harvesters, of which the following is a full, clear, and exact description.

Reference is to be had to the accompanying drawings, forming part of this specification, in which similar letters of reference indicate corresponding parts in all the figures.

Figure 1 is a side elevation of my improvement, shown in position for dropping a bundle. Fig. 2 is a plan view of the same, shown in position to receive a bundle; and Fig. 3 is a rear elevation of the same, partly in section.

The object of this invention is to transfer bound bundles singly from the binding-table to a table in the rear of the harvester and then drop them, a number at a time, to the ground.

The invention consists in a bundle-carrier for harvesters, constructed with gear-wheels connected with the harvester mechanism and carrying a swinging shaft having curved arms to carry the bundles, and provided at its inner end with a trip-arm to turn the swinging shaft to raise its arms to receive a bundle and to depress the said arms to discharge the bundle. To the rear part of the harvester-frame is hinged a table to receive the bundles singly and drop them in groups at the rear of the harvester. To the rearwardly-extended end of the shaft that drives the carrier is attached a curved arm to push the bundles forward as they are deposited upon the receiving-table, and make room for the following bundles, as will be hereinafter fully described.

A represents the drive-wheel, B the frame, and C the binding-table, of a harvester.

E represents the pressure-arm, operated by the gavel to throw the binding mechanism into gear, and which is raised, when the bundle is bound, to allow the bundle to be removed from the binding-table C by the pusher-arm E. The pusher-arm E is attached to the shaft F, which works in bearings attached to the frame B, and has a crank, G, attached to its forward end.

To the crank G is pivoted the end of a pitman, H, the other end of which is connected with the driving mechanism of the harvester, and is so arranged that the shaft F will be turned a quarter of a revolution to raise the pusher-arm E and push the bundle from the binding-table C, and will then be turned back to return the said pusher-arm E to its place.

As thus far described there is nothing new in the construction.

In my improvement I extend the shaft F to the rearward, and to it, a little distance from its rear end, is attached a beveled-gear wheel, I, into the teeth of which mesh the teeth of a gear-wheel, J, having half as many teeth as the said gear-wheel I, so that a quarter of a revolution of the gear-wheel I will give the gear-wheel J a half-revolution. The gear-wheel J revolves upon the lower end of the short vertical shaft K, the upper part of which is secured to the frame B. To the small gear-wheel J is secured a circular plate, L, to hold the carrier-shaft M, which is secured to the said holder L by hook-bolts or other suitable means that will hold it securely and allow it to turn freely.

To the carrier-shaft M are attached curved arms N, to receive and carry the bundles.

To the inner end of the carrier-shaft M is attached an upright arm, O, which, when the said shaft M is swung forward, passes beneath the binding-table C or a trip-plate, P, attached to the said table, and turns the shaft M so far as to raise the arms N into a horizontal position. With this construction, when the shaft F is turned to raise the pusher E to push the bound bundle from the binding-table C the said movement of the said shaft F operates the gear-wheels I J and swings the carrier-shaft M around to the side of the machine, and at the same time the trip-arm O turns the said carrier-shaft M and raises its arms N into a horizontal position, ready to receive the bound bundle from the binding-table C. As the shaft F is turned in the other direction to lower the pusher E the gear-wheels I J swing the carrier-shaft M around to the rear of the machine. As the shaft M completes its movement the trip-arm O passes out from beneath the table C or the trip-plate P, and allows the weight of the bundle to turn the shaft M and depress the arms N, so that the bundle will slide from the said arms N to the table Q, leaving the carrier free to be swung forward to receive another bundle.

To the rearwardly-extended end of the shaft F is attached an arm, R, the outer end of which is made wide and is slightly concaved. The arm R is so curved as to bring its outer end into such a position that when the shaft F is turned to swing the carrier forward to receive another bundle the outer end of the arm R will be pressed against the bundle last deposited upon the table Q, and will push the said bundle and all other bundles upon the said table in front of the said last bundle forward, so as to leave a space to receive the next bundle. As the shaft F is turned to swing the carrier back to the rear of the machine with another bundle the arm R is swung back out of the way.

The table Q is hinged to the rear of the frame B, so that it can be turned down to drop the collected bundles to the ground. The table Q can be lowered, raised, and supported by a lever extending into such a position that it can be readily reached and operated by the driver; or the table Q can be supported by a mechanism arranged to be tripped by the bundles when they have been pushed to the rear end of the said table, the table being lowered to discharge the bundles by the weight of the said bundles and raised by a spring when the bundles have been discharged; or by attaching suitable mechanism the receiving-table Q may be operated when any certain number of bundles have been deposited thereon, the number varying as the said mechanism may be adjusted.

I have described my improvement as applied to the "Walter A. Wood Twine-Binding Harvester," but do not limit myself to that use, as it may be applied to any self-binding harvester by adjusting the gear-wheels and motion of the carrier to the gearing and motion of the said harvester.

Having thus described my invention, I claim as new and desire to secure by Letters Patent—

1. In a bundle-carrier for harvesters, the combination, with a binding-table and means for discharging the bundle from the same, of a swinging shaft provided with curved arms, and means, substantially as herein shown and described, for swinging the said shaft around to the side of the binding-table, and for raising the curved arms to receive the bundles, and for depressing them to discharge the same, as set forth.

2. In a bundle-carrier for harvesters, the combination, with the shaft F, that operates the bundle-discharging pusher, of the gear-wheels I J, and the swinging shaft M, having curved bundle-receiving arms N, and provided with a trip-arm, O, substantially as herein shown and described, whereby the bundles will be received singly at the side of the harvester, carried to the rear of the said harvester, and discharged, as set forth.

3. In a bundle-carrier for harvesters, the table Q, hinged to the rear of the harvester-frame, in combination with the carrier-shaft M N, the pusher-arm R, and mechanism, substantially as herein shown and described, for operating said carrier-shaft and pusher-arm, as set forth.

4. In a bundle-carrier for harvesters, the combination, with the extended rear end of the shaft that operates the bundle-discharging pusher, of the curved arm R, substantially as herein shown and described, whereby the bundles will be pushed forward upon the receiving-table to make room for the successive following bundles, as set forth.

JAMES WILLIAM REID.

Witnesses:
J. W. McCAUSEY,
C. W. SAUNDERS.